United States Patent Office 3,432,578
Patented Mar. 11, 1969

3,432,578
CONJUGATED DIENE POLYMER COMPOSITIONS STABILIZED WITH CERTAIN HYDROXYLAMINES
Jon W. Martin, Los Alamitos, Calif., assignor to Shell Oil Company, New York, N.Y., a corporation of Delaware
No Drawing. Filed Oct. 5, 1964, Ser. No. 401,637
U.S. Cl. 260—880
Int. Cl. C08d *11/04;* C08f *45/60, 15/04*
7 Claims

ABSTRACT OF THE DISCLOSURE

Conjugated diene polymers are stabilized against the adverse effects of ultraviolet light by adding a small amount of a hydroxylamine of the formula

wherein R is selected from aryl and aralkyl radicals.

This invention relates to the stabilization of conjugated diene polymer. More particularly, it is especially concerned with the protection of certain block copolymers from the adverse effects of ultraviolet radiation.

The stabilization of polymeric materials has been investigated in many aspects. Broadly, stabilizing substances are utilized for one of several reasons; namely, to prevent oxidation by atomospheric oxygen or its equivalent, to minimize the effect of ozone, to depress the adverse effects of ultraviolet light or its equivalent and to minimize the effects of cross-linking or depolymerization and the attendent change in physical properties such as reduction in flexibility or increase in brittleness, another major concern is to discover classes of materials which will stabilize a given polymer in one or more of the above, respects, but at the same time will do so without unduly increasing the color of the stabilized composition.

The influence of ultraviolet light upon polymers and particularly upon polymers prepared from conjugated diene monomers is of prime importance in many of the end uses for such products. These include, for example, coatings, moldings, laminates, safety glass adhesives, film, fibers, and the like. If the polymer is sensitive to either cross-linking or degradation under the influence of ultraviolet light, the properties of the polymer change radically and the products made therefrom shortly become unsatisfactory in one physical property or another.

It is an object of the present invention to provide improved compositions stabilized against the influence of ultaviolet light. It is another object of the invention to provide elastomeric compositions having improved stability relative to ultraviolet light. It is a particular object of the invention to provide improved block copolymers of conjugated dienes stabilized against ultraviolet light. Other objects will become apparent during the following detailed description of the invention.

Now, in accordance with the present invention, conjugated diene polymers are stabilized against the effects of ultraviolet light to an unexpectedly great degree by the presence of a stabilizing minor portion of a diarylhydroxylamine. Still in accordance with the present invention, a particular class of such conjugated diene polymers is especially responsive to the influence of dibenzylhydroxylamines (including alkyl-substituted dibenzylhydroxylamines), said class comprising of those having the general structure:

A—B—A wherein each A is polyvinylarene block and B is a polymer block of a conjugated diene, such as isoprene or butadiene.

The class of diarylhydroxylamines especially useful for this purpose is relatively restricted and includes particularly the following:

diphenylhydroxylamine
dibenzylhydroxylamine
phenylbenzylhydroxylamine
dinaphthylhydroxylamine
di(phenylethyl)hydroxylamine
di(2,4-dimethylphenyl)hydroxylamine Of the above, dibenzylhydroxylamine and its alkyl derivatives wherein the alkyl groups are substituents on the aromatic ring are preferred for the present purpose. They may be used in relatively wide amounts (usually 0.2–2.5% by weight based on the polymer) dependent upon the conditions to which the composition will be subjected as well as upon the specific block copolymer being so stabilized.

The block copolymers may be either elastomeric or thermoplastic in character dependent not only upon the individual average molecular weights of the various blocks, but upon the ratio of a thermoplastic end block relative to the elastomeric center block. The ultraviolet sensitivity of the block copolymers usually increases directly with the portion of the conjugated diene center block.

Typical block copolymers especially contemplated have the general structure:

polystyrene-polyisoprene-polystyrene and polystyrene-polybutadiene-polystyrene

Suitable conjugated diene polymers other than block polymers include the homopolymers of conjugated dienes having 4–8 carbon atoms per molecule, such as polybutadiene and polyisoprene. The striking aspect of the present invention comprises not only the outstanding resistance to adverse influences of ultraviolet light upon the stabilized polymer but also the fact that in the course of such stabilization essentially no change in color of the composition occurs. This is sharply contrasted with many phenolic stabilizers, for example, which while imparting stabilization at the same time form yellow or brown, even brown-black compositions.

The hydroxylamine may be mixed with the polymers under any suitable conditions such as, by dissolving the hydroxylamine in a cement of the polymer in a suitable solvent after which the stabilized cement may be used as such for purposes such as, the formation of surface coatings, film or fiber extrusion, etc., or the composition may be coagulated such as by precipitation in hot water to form polymer crumbs. These in turn may be compounded with other polymer composition components including pigments, plasticizers, extenders, reinforcing agents, curatives, sulfur, and the like. Supplementary stabilizers may be used as well.

The subject diaryl (including arylalkyl) hydroxylamines not only provide protection against the deleterious effects of ultraviolet light but also appear to stabilize the polymer during hot mill mixing and unexpectedly provide internal lubrication for the composition.

The degradation of the subject block copolymers in the presence of sunlight is apparently accelerated in contact with oxygen. This degradation, however, is minimized by the presence of the subject hydroxylamines. The effectiveness of the diarylhydroxylamines is found to be dependent upon the type of substitution. Hence, the comparative data contained in the working example shows that dialkylhydroxylamines are completely ineffective for stabilization against the effects of ultraviolet light in the protection of block copolymers.

The following comparative data illustrate the advantages gained by the use of the preferred species of the diarylhydroxylamines for the stabilization of a block polymer having the general configuration:

polystyrene-polybutadiene-polystyrene wherein the average block molecular weights are 12,000–44,000–12,000. The base polymer was modified with the following compounding ingredients: Base polymer is three-block copolymer of styrene (12,000 M.W.)-butadiene (44,000)-styrene (12,000). This was in "nib" form (chopped extrudate). These "nibs" were mill-massed three minutes on a 6" laboratory mill at 150° C. roll temperature. They were then pressed at 140° C. for ten minutes to form sheets of dimension 3" x 5" x 0.075". These sheets were used for the testing.

For the addition of the stabilizers, the "nibs" were milled for the three minute period at 150° C. in the presence of powdered or liquid stabilizers. Mixing was assisted by use of a doctor blade. The base polymer was further modified as indicated in Table I below with a number of potential stabilizing additives after which the compositions were exposed to ultraviolet light under standard conditions.

The above sheets were symmetrically placed on a 16" diameter turntable which rotated at 1 r.p.m. and was covered with white cardboard. Two GE 275 watt sunlamp bulbs were located 12" apart and 14" above the samples. The entire system above was placed in a 21" square by 36" high enclosed metal compartment having silver painted walls.

The effect of ultraviolet light upon the polymers was tested by the change in melt flow index which was arbitrarily determined by measuring the rate of flow in grams per 10 minutes through a standard orifice, after exposure for a given length of time. According to the table it will be seen, that the control sample and samples stabilized with either the phenylsalicylate or the benzyltriazole as well as with the diethyl hydroxylamine rapidly degraded even in the course of the first hour of exposure to ultraviolet light. Compared with this, however, the modification of the base polymer with dibenzyl hydroxylamine provided a substantially greater stabilization against the deleterious effect of ultraviolet light.

TABLE I.—RELATIVE UV STABILITY

| Sample | Melt flow [1] after time of exposure, hr. | | | | |
|---|---|---|---|---|---|
| | 1 | 2 | 3 | 4 | 5 |
| Control [2] | 0.6 | 0.2 | | | |
| Control+0.2 phr. phenylsalicylate | 0.85 | 0.2 | | | |
| Control+0.2 phr. hydroxyphenylbenzotriazole | 2.3 | 0.2 | | | |
| Control+0.2 phr. diethylhydroxylamine | 0.6 | 0.2 | | | |
| Control+0.2 phr. dibenzylhydroxylamine | 3.7 | 1.5 | | | |
| Control+1.0 phr. dibenzylhydroxylamine | 4.0 | 3.8 | 3.7 | 2.9 | 2.0 |

[1] G. flow per 10 minutes.
[2] All samples contained 1.5 phr. 2, 6-di-tert-butyl-4-methylphenol,1, 3, 5-trimethyl-2, 4, 6-tris (3, 5-di-tert-butyl-4-hydroxybenzyl) benzene and dilaurylthio dipropionate and 0.1 phr. lignin sulfonate.

The compositions of this invention, being outstanding in their stability with respect to sunlight or other source of ultraviolet, are particularly suitable for outdoor exposures such as in the form of fibres or films as well as coatings, lacquers, and elastomeric protecting surfaces. They may be modified by the presence of other polymers such as polyolefines, polystyrene, or other elastomers.

I claim as my invention:

1. A conjugated diene polymer containing a stabilizing amount of a hydroxylamine selected from the group consisting of: diphenylhydroxylamine, dibenzylhydroxylamine, phenylbenzylhydroxylamine, dinaphthylhydroxylamine, di(phenylethyl)hydroxylamine and di(2,4-dimethylphenyl)hydroxylamine.

2. Polyisoprene containing a stabilizing amount of a hydroxylamine selected from the group consisting of: diphenylhydroxylamine, dibenzylhydroxylamine, phenylbenzylhydroxylamine, dinaphthylhydroxylamine, di(phenylethyl)hydroxylamine and di(2,4-dimethylphenyl)hydroxylamine.

3. Polybutadiene polymer containing a stabilizing amount of a hydroxylamine selected from the group consisting of: diphenylhydroxylamine, dibenzylhydroxylamine, phenylbenzylhydroxylamine, dinaphthylhydroxylamine, di(phenylethyl)hydroxylamine and di(2,4-dimethylphenyl)hydroxylamine.

4. A block copolymer of styrene and a conjugated diene containing a stabilizing amount of a hydroxylamine selected from the group consisting of: diphenylhydroxylamine, dibenbylhydroxylamine, phenylbenzylhydroxylamine, dinaphthylhydroxylamine, di(phenylethyl)hydroxylamine and di(2,4-dimethylphenyl)hydroxylamine.

5. A block copolymer having the structure of polystyrene-polyisoprene-polystyrene containing a stabilizing amount of a hydroxylamine selected from the group consisting of: diphenylhydroxylamine, dibenzylhydroxylamine, phenylbenzylhydroxylamine, dinaphthylhydroxylamine, di(phenylethyl)hydroxylamine and di(2,4-dimethylphenyl)hydroxylamine.

6. A block copolymer having the structure polystyrene-polyisoprene-polystyrene containing a stabilizing amount of dibenzylhydroxylamine.

7. Polyisoprene containing a stabilizing amount of dibenzylhydroxylamine.

References Cited

UNITED STATES PATENTS

| 2,013,319 | 9/1935 | Semon | 260—809 |
| 3,219,701 | 11/1965 | O'Shea | 260—45.9 |
| 3,265,765 | 8/1966 | Holden et al. | 260—876 |

FOREIGN PATENTS 584,203 9/1959 Canada.

GEORGE F. LESMES, *Primary Examiner.*

U.S. Cl. X.R.

260—45.9, 570.8, 570.9, 576, 577, 809, 879